United States Patent Office 3,438,993
Patented Apr. 15, 1969

3,438,993
PYRIDINE ESTERS OF CYCLOPROPANECARBOXYLIC ACID
Godfrey Wilbert, Carmel, Seymour Hyden, Spring Valley, and Henry Wetstein, Monroe, N.Y., assignors to Nepera Chemical Co., Inc.
No Drawing. Filed Mar. 23, 1966, Ser. No. 536,637
Int. Cl. C07d 31/34, 33/48; A01n 9/22
U.S. Cl. 260—295                2 Claims

ABSTRACT OF THE DISCLOSURE

The present invention discloses pyridine and quinoline esters of cyclopropanecarboxylic acid, for example, 3-pyridyl cyclopropanecarboxylate and 3-pyridylmethyl cyclopropanecarboxylate. These compounds are prepared by treating cyclopropanecarboxylic acid chlorides with a pyridinehydroxy compound or a quinolinehydroxy compound.

These compounds are useful as herbicides.

This invention relates to a composition of matter and relates more particularly to compounds of the formula:

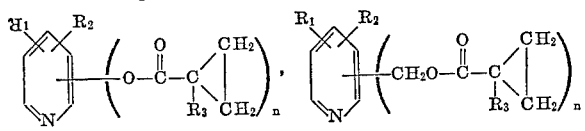

and

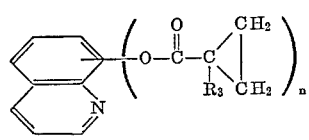

wherein $R_1$ and $R_2$ each represent hydrogen, lower alkyl, halogen, nitro, lower alkoxy and acyl and $R_3$ represents lower alkyl and $n$ is an integer from 1 to 2.

As used herein, the terms lower alkyl and the alkyl portion of lower alkoxy refer to both straight and branched chain alkyl of 1 to 6 carbon atoms such as methyl, ethyl, propyl and the like. The term halogen includes all four halogens. The term acyl is a residue of carboxylic acids such as acetyl, propionyl, benzoyl and the like.

The compounds of this invention are useful as agricultural herbicides and as intermediates for other herbicides and pharmaceuticals. For use as a herbicide about 1 part by weight of the compounds is dissolved or suspended in about one million parts by weight of an aqueous solvent and applied as a spray to plants.

According to the process of this invention, these compounds are prepared by reacting cyclopropanecarboxylic acid chlorides of the formula:

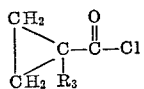

with heterocyclic hydroxy compounds of the formula:

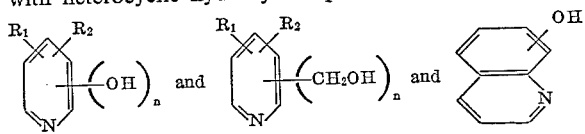

in which R is as defined. This reaction is effected at a temeprature of −10° C. to 50° C. in a solvent system comprising pyridine or an alkyl pyridine. The desired reaction product may be recovered by diluting the reaction mixture with ice-water, followed by extraction with a solvent such as ether, if necessary. The crude ester may be purified using distillation or crystallization techniques.

In order to further illustrate the practice of this invention, the following examples are given:

Example 1.—8-quinolyl cyclopropanecarboxylate

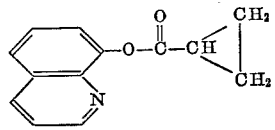

29.0 g. of 8-hydroxyquinoline are dissolved in 50 ml. of pyridine and cooled to 0° C. 20.8 g. of cyclopropanecarboxylic acid chloride are added dropwise, with stirring, while maintaining the temperature at 0° C. to 20° C. The reaction mixture is then stirred one hour at ambient temperature such as from 20° C. to 30° C. and added to 250 ml. of ice-water to afford 8-quinolyl cyclopropanecarboxylate as a tan solid product. This product, after recrystallization from methanol-water, has a M.P. of 115–116° C.

Example 2.—3-pyridyl cyclopropanecarboxylate

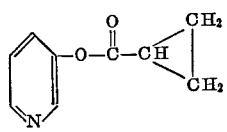

In an analogous manner, as described in Example 1, 9.5 g. of 3-hydroxypyridine and 12.0 g. of cyclopropanecarboxylic acid chloride are reacted in 25 ml. of pyridine at 20° C. to 50° C. to yield 3-pyridyl cyclopropanecarboxylate. The product is isolated by quenching in ice-water and extracting with ether. The pure ester is obtained by distillation at 105–108° C./6 mm.

Example 3.—3-pyridylmethyl cyclopropanecarboxylate

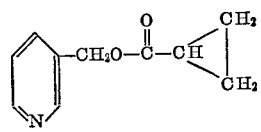

In an analogous manner as described in Example 1, 16.4 g. of 3-pyridine carbinol and 15.6 g. of cyclopropanecarboxylic acid chloride are reacted in 25 ml. of pyridine at 0° C. to 30° C. to yield 3-pyridylmethyl cyclopropanecarboxylate. The product is isolated by extraction with ether and the pure ester is obtained by distillation at 90–95° C./2–3 mm.

It is understood that the foregoing detailed description is given merely by way of illustration and that many variations may be made therein without departing from the spirit of our invention.

Having described our invention, what we desire to secure by Letters Patent is:
1. 3-pyridyl cyclopropanecarboxylate.
2. 3-pyridylmethyl cyclopropanecarboxylate.

References Cited

UNITED STATES PATENTS

| | | | |
|---|---|---|---|
| 3,249,419 | 5/1966 | Martin | 260—295 X |
| 3,268,533 | 8/1966 | Freed | 260—268 |
| 3,297,525 | 1/1967 | Grier | 260—286 X |

ALEX MAZEL, Primary Examiner.

D. G. DAVIS, Assistant Examiner.

U.S. Cl. X.R.

71—94; 260—287, 289, 297, 544